April 23, 1963  S. H. DIKE ET AL  3,087,155
GUIDANCE SYSTEM FOR AIRCRAFT
Filed Feb. 3, 1951  6 Sheets-Sheet 1
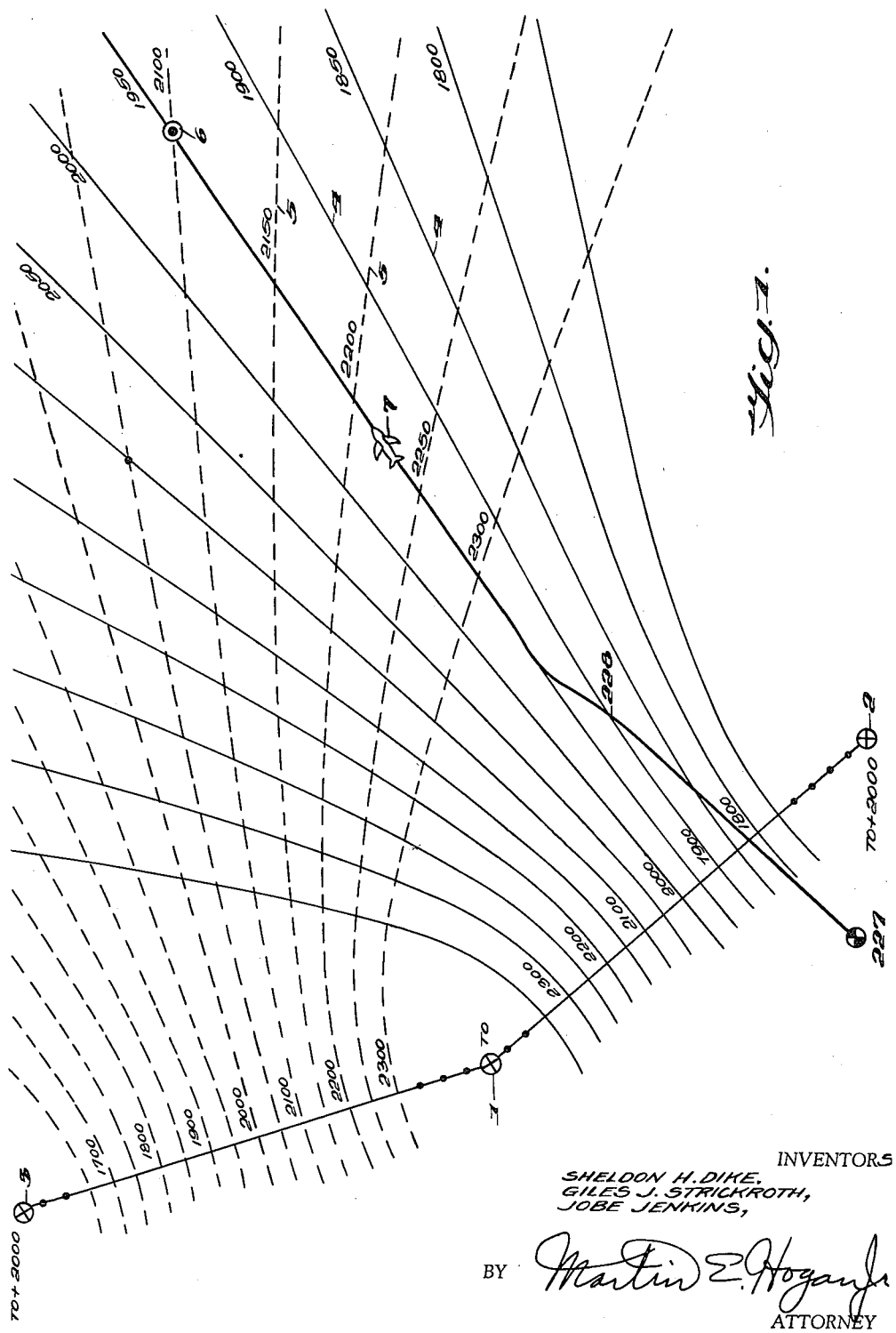
INVENTORS
SHELDON H. DIKE,
GILES J. STRICKROTH,
JOBE JENKINS,
BY
ATTORNEY

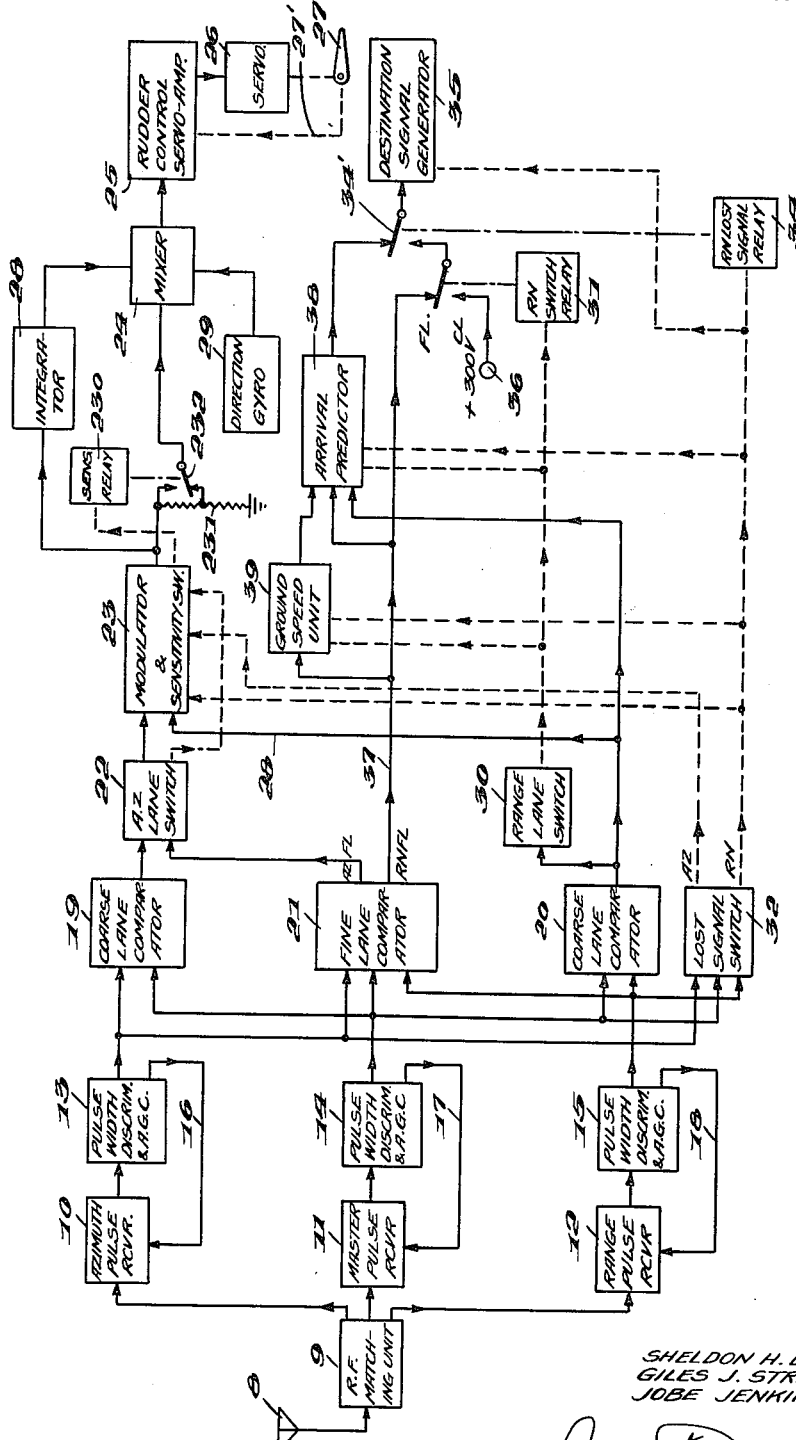

April 23, 1963 S. H. DIKE ET AL 3,087,155
GUIDANCE SYSTEM FOR AIRCRAFT
Filed Feb. 3, 1951 6 Sheets-Sheet 3
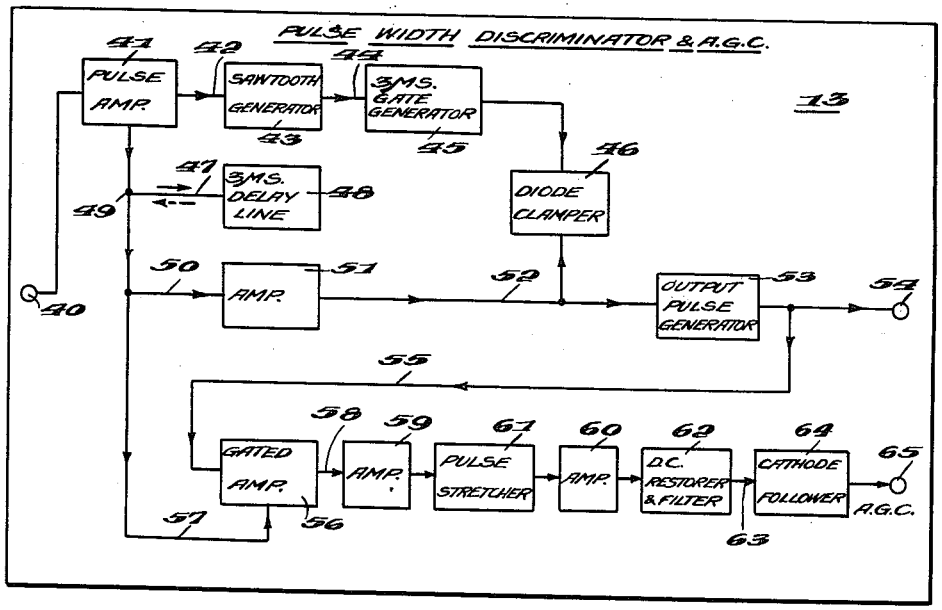
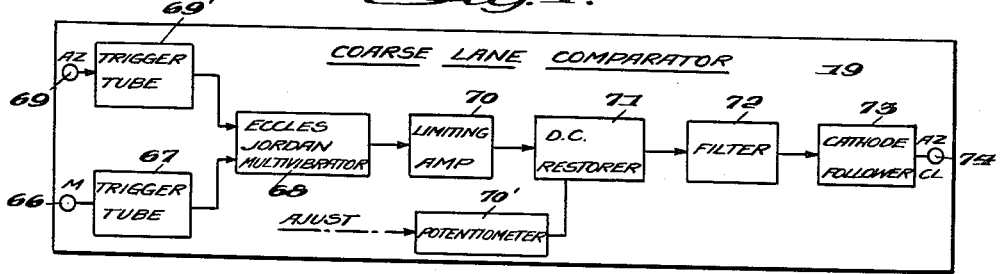
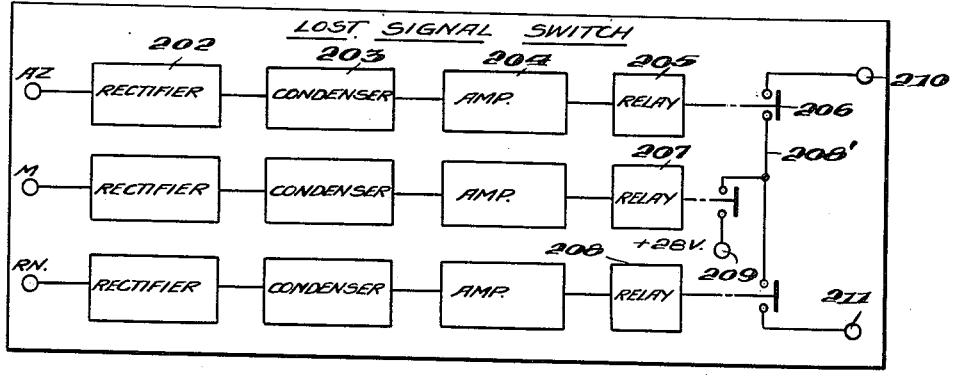
INVENTORS
SHELDON H DIKE,
GILES J. STRICKROTH,
JOBE JENKINS,
BY
ATTORNEY April 23, 1963  S. H. DIKE ET AL  3,087,155
GUIDANCE SYSTEM FOR AIRCRAFT
Filed Feb. 3, 1951  6 Sheets-Sheet 4

INVENTORS
SHELDON H. DIKE,
GILES J. STRICKROTH,
JOBE JENKINS,

BY Martin E. Hogan Jr.
ATTORNEY

April 23, 1963 S. H. DIKE ET AL 3,087,155
GUIDANCE SYSTEM FOR AIRCRAFT
Filed Feb. 3, 1951 6 Sheets-Sheet 5
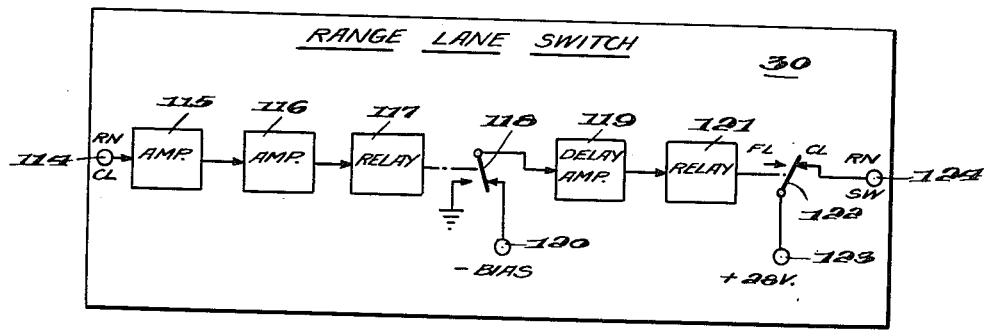
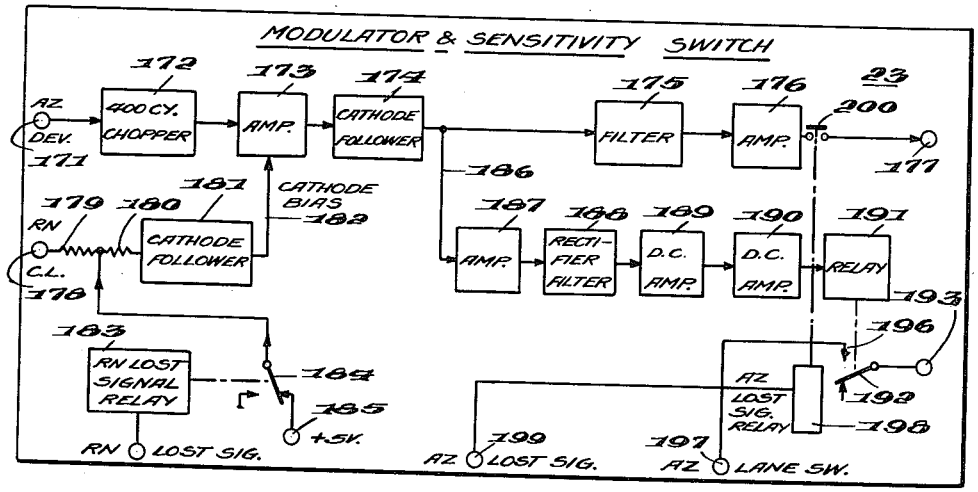
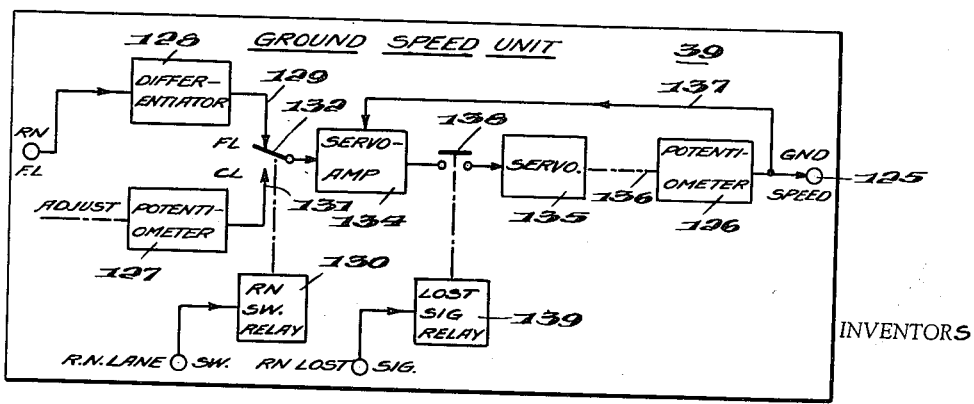
INVENTORS
SHELDON H. DIKE,
GILES J. STRICKROTH,
JOBE JENKINS,
BY Martin E. Hogan Jr.
ATTORNEY

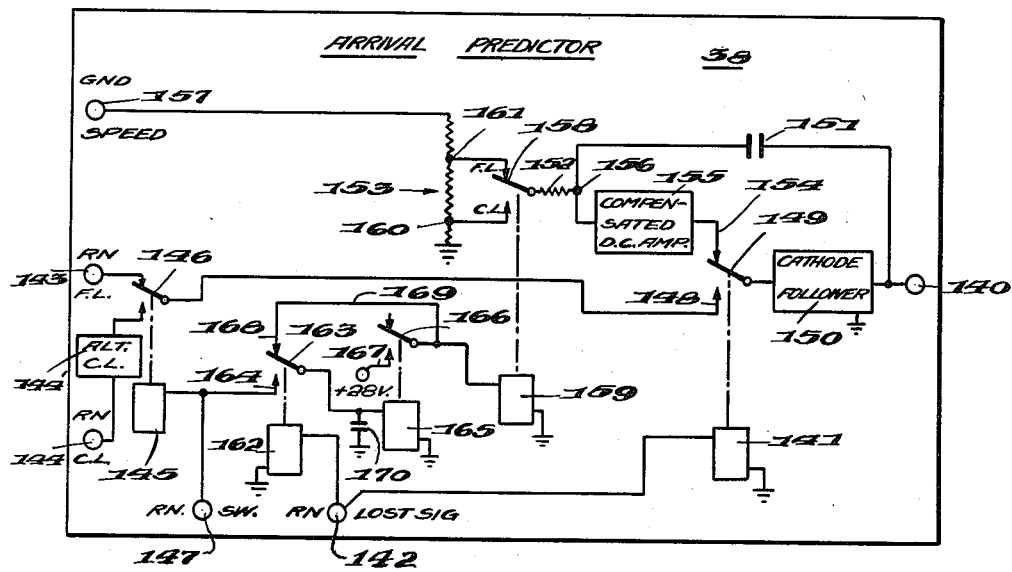

3,087,155
Patented Apr. 23, 1963

3,087,155
GUIDANCE SYSTEM FOR AIRCRAFT
Sheldon H. Dike, Giles J. Strickroth, and Jobe Jenkins, Baltimore, Md., assignors to The Martin-Marietta Corporation, a corporation of Maryland
Filed Feb. 3, 1951, Ser. No. 209,316
6 Claims. (Cl. 343—112)

This invention relates to an improvement in guidance systems for aircraft, particularly pilotless aircraft.

It is obviously desirable, both for commercial and military purposes, to provide a guidance system whereby an aircraft may be automatically controlled so as to fly from any point to a desired destination. While heretofore many schemes have been proposed, directed toward this end, for one reason or another, they have proven to be unsatisfactory.

It is therefore an object of this invention to provide a guidance system for an aircraft by means of which the aircraft will be automatically guided along a predetermined course to its destination and wherein a suitable signal will be produced within the aircraft at the time it arrives over its destination.

A further object of this invention is to provide such a guidance system wherein guidance signals are transmitted from pairs of transmitting stations to the aircraft and wherein apparatus is carried on the aircraft for controlling the flight thereof in accordance with the remotely transmitted signals.

It is a further object to produce such an arrangement wherein, once the guidance signals have been received at the missile for a predetermined length of time, if they are thereafter lost, the missile will continue to fly along its last indicated course and, wherein an arrival signal will be generated when the aircraft arrives in the immediate area of its destination.

Still another object is to provide means in conjunction with such a guidance system, whereby only the desired guidance signals will be effective to control the aircraft.

A further object is to provide a guidance system which is especially useful for the control of military aircraft of the guided missile type intended for short or medium range operation.

Still another object is to provide such a guidance system wherein the components may be preadjusted prior to take-off of the aircraft, so that the aircraft will automatically fly to any predetermined point within its effective range.

Further objects will become apparent from a consideration of the following description and claims when read in the light of the attached drawings.

In the drawing:

FIGURE 1 is a diagrammatic showing of one application of the guidance system.

FIGURE 2 is a block diagram of the components of the system, carried on the aircraft or missile.

FIGURES 3 through 12 are detailed block diagrams of the individual components shown in FIGURE 2.

Figure 5:
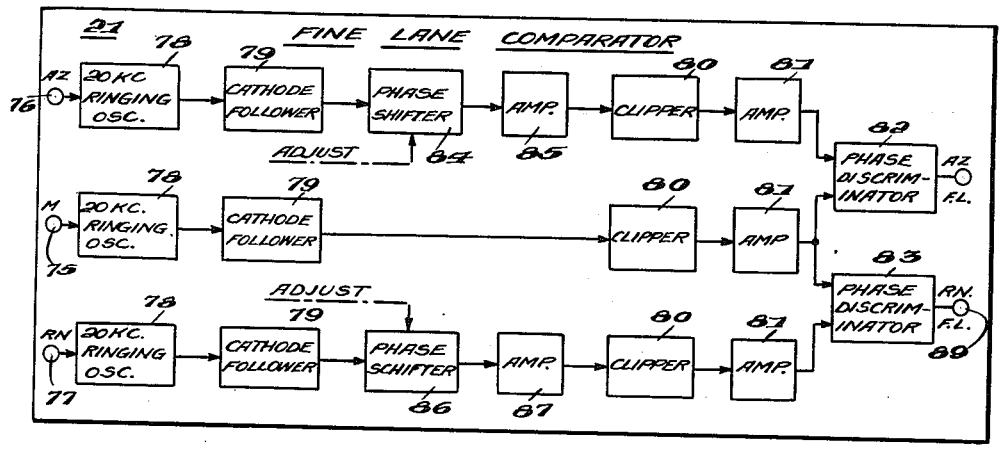

The guidance system of the present invention utilizes three radio transmitting stations located at relatively widely spaced points and consisting of a master station 1, an azimuth slave station 2 and a range slave station 3. The master station 1 is arranged to transmit at periodic intervals (for example every 2500 microseconds) a short guidance pulse, hereafter called the master pulse, and for ease of identification, the time of transmission of the master pulse will be considered as $t_0$. Each of the slave stations is synchronized with the master station so as to transmit a guidance pulse at a predetermined time later than the master pulse. A suitable synchronization system for such purpose is fully shown and described in copending application Serial No. 185,448, filed September 18, 1950, now Patent No. 2,869,121. In this particular case, both the azimuth pulse and the range pulse will be considered as being transmitted 2000 microseconds later than the master pulse. It can readily be shown that with such an arrangement, any remote point can be defined in terms of the difference in the times of arrival or what may be termed the relative time-phase of the master pulse and the slave pulses at that point. It can also be shown that all points wherein the time-phase of or time difference between the master and azimuth pulses, for example, is constant will lie along a hyperbolic curve such as 4, having the master station and the azimuth station as its foci. Similarly, all points at which the master pulses and range pulses are received with a constant time difference will lie along a hyperbola such as 5 having the range station and the master station as its foci. Thus, any particular point may be positively identified in terms of hyperbolic time difference curves generated by the two pairs of stations. For example, in FIGURE 1, the destination or target 6 has been shown as located at the intersection of azimuth hyperbola 1950 and range hyperbola 2100. The numerical designation applied to these curves in FIGURE 1 corresponds to the time-phase or arrival time difference between the master and slave pulses along that particular line. Thus, when the aircraft or missile 7 arrives at a point in space where the azimuth pulse is received 1950 microseconds after the master pulse and the range pulse is received 2100 microseconds after the master pulse, it will be directly over the target 6.

In the present guidance system, the aircraft or missile 7 is arranged to fly along the particular azimuth hyperbolic curve generated by the master and azimuth stations and which passes directly over the target 6. The missile will fly along this path until such time as it reaches the point of intersection with the range hyperbola passing through the target and defined by the master and range slave stations. At this time, a suitable destination signal will be generated to indicate that the missile has arrived directly over the target.

Thus each master pulse and the corresponding azimuth pulse together constitute a course guidance signal since the time phase of these pulses at the missile may be used, as set forth below, to determine its position relative to a desired azimuth hyperbola and to initiate any control corrections required to cause it to fly along said hyperbola. Similarly each master pulse and the corresponding range pulse together constitute a range guidance signal which may be used to determine the exact position of the missile along its desired flight path and thereby the distance or range from the missile to the target.

Turning now to FIGURE 2, the circuit elements which are located on the aircraft or missile are shown in block diagram. The three guidance pulses are received by an antenna 8 carried by the missile and are selectively directed by means of an RF matching unit to their respective receivers. The azimuth pulse is detected by the azimuth pulse receiver 10 and the video output of the receiver is fed to a suitable pulse width discriminator 13 which will permit the passage only of those pulses which correspond in time length to the pulses sent out by the azimuth transmitter. Thus extraneous interference such as might be caused by radar equipment, etc. will be prevented from adversely affecting the control system. The pulse width discriminator also includes an automatic gain control unit for regulating the gain of the receiver in accordance with the signal strength of the azimuth pulses. The video output from the pulse width discriminator is applied to one input of an azimuth coarse lane comparator 19 and also to one input of an azimuth fine lane comparator 21.

The master pulse is similarly detected by the master pulse receiver 11, fed through pulse width discriminator 14, which as above described also includes the automatic gain circuits for the receiver, and the video output from the pulse width discriminator is applied to the other inputs of the azimuth coarse and fine lane comparators 19 and 21. These comparators provide output voltages which correspond to the arrival time difference between or time phase of the master and slave pulses. As will hereinafter be described in detail, they are so adjusted that the output voltage therefrom will have a predetermined value when the missile is flying along the desired hyperbolic course.

The outputs from the coarse and fine lane comparators are applied to an azimuth lane switch 22. This lane switch is so arranged that when the missile is in the coarse lane region, that is, is outside of a relatively narrow path running along the desired hyperbolic curve, a constant value output voltage is applied to the rudder or yaw control apparatus of the missile to cause it to fly at a predetermined angle (substantially 15°) toward the desired hyperbolic path. When the missile approaches within the limits of the fine lane region, the output voltage from the coarse lane comparator drops to a predetermined value and causes the lane switch 22 to be actuated so as to place the missile control system under the direct control of the fine lane comparator 21.

In either case, the D.C. output from the azimuth lane switch is applied to a modulator and sensitivity switch 23 which converts the D.C. input voltage to a 400 cycle A.C. voltage of an amplitude and phase corresponding to the amount and direction of deviation of the missle from its desired path. The output from the modulator is applied through a mixer 24 to a servo amplifier 25 to cause a corresponding actuation of the servo mechanism 26 used to position the rudder 27. A conventional follow-up or feed back system is provided indicated at 27' for stopping operation of the servo mechanism when the rudder has moved to the proper position to guide the missile back toward the desired path.

To compensate for errors that might arise due to side drift caused by winds blowing the aircraft laterally off its course, a relatively long time constant integrator is provided which integrates the error signal output of the modulator to detect any tendency of the missile to stay more or less constantly to one side or the other of the desired path. The output from this integrator is mixed in the mixer 24 with the output from the modulator and provides automatic compensation for side drifting tendencies. A directional gyro output signal is also combined in the mixer 24 with the outputs of the integrator and the modulator to co-act therewith so as to provide a control signal output from the mixer that will tend to bring the missile to and to hold it on the desired course.

As is clearly shown in the block diagram, the master and range pulses are also compared as to time by the range coarse lane comparator and the range fine lane comparator. Here again the range comparator will be adjusted so that their output voltages have a predetermined value at the time the missile reaches the range hyperbola passing through the target. The output from the coarse lane comparator is used to control a range lane switch which, as is hereafter described, controls suitable range switch relays so as to actuate them when the missile reaches a point relatively close to the target. The output from the coarse lane comparator is also applied to the modulator and sensitivity switch so as to tend to maintain the volts-per-foot output of the modulator substantially constant despite the divergence between the hyperbolic lines as the missile moves farther and farther away from the master and slave stations.

Normally, when the guidance pulses are being received, the arrival of the missile at its destination will be controlled by the fine lane comparator output voltage. When this voltage reaches a predetermined value, the destination signal generator will be made operative to release the bomb or cause the missile to dive onto its target, or actuate any other desired mechanism within the missile. To provide for the situation where the range guidance pulses are lost, an arrival predictor is provided. This predictor utilizes a voltage corresponding to the ground speed of the missile and the last output voltage from the coarse lane comparator to generate an output arrival signal at a time which would correspond to the expected arrival of the missile over its target, based on its speed and position at the time that the range signals were lost.

The ground speed voltage applied to the arrival predictor is obtained from a ground speed unit. This ground speed unit differentiates the output voltage from the range fine lane comparator to produce a voltage corresponding to the ground speed.

A lost signal switch is also provided to disconnect the rudder control servo amplifier and the destination signal generator from control by the guidance system in case the guidance pulses are lost. As will later become apparent, the arrangement is such that if either of the master or azimuth pulses are lost, the missile will continue to fly along its last controlled course under the control of the direction gyro. Similarly, if either the master pulse or range pulse is lost, the destination signal generator will be disconnected from control by the range comparator and will be connected to the arrival predictor. If, after the guidance pulses have thus been lost, they are again received at the missile, they will again take over control of the rudder control servo amplifier and the destination signal generator.

The detailed operation of the guidance system will best be understood from the following description of the major components of the system which are shown in block diagram form in FIGURES 3 through 12.

*Pulse Width Discriminator and Automatic Gain Control Units*

(FIGURE 3)

The video outputs from the various pulse receivers 10, 11 and 12 are fed to individual pulse width discriminator and automatic gain control units 13, 14 and 15. Since each of these units is identical with the others, but one will be described in detail. Turning to FIGURE 3, a block diagram of the azimuth discriminator and AGC unit 13 is shown. The video input pulse from the azimuth pulse receiver 10 is applied at 40 and is fed to a pulse amplifier 41. The output from the plate of the pulse amplifier will be in the form of an inverted pulse corresponding in length to the pulse from the receiver. This inverted, amplified pulse is applied as at 42 to a saw-tooth wave generator 43, the output of which will be a saw-tooth wave having a time length corresponding to the length of the video input pulse and rising to a peak voltage which will also correspond to the length of the input pulse. This saw-tooth wave is applied as at 44 to a gate generator 45 which is so adjusted as to produce, when triggered, a positive-going gating pulse of substantially three microseconds' duration. The gate generator is so biased that it will be triggered only when the saw-tooth voltage has reached a value corresponding to a pulse length of three microseconds. Thus any pulse which is more than three microseconds in length will trigger the gate generator so as to produce a gating voltage beginning at substantially three microseconds after the leading edge of the input pulse from the receiver and having a duration of three microseconds.

Returning to the pulse amplifier 41, a second output pulse is obtained from the cathode thereof. This last mentioned pulse will be a positive pulse corresponding in time length and amplitude to the input pulse from the receiver and is applied as at 47 to a three microsecond, open-ended delay line 48. Due to the nature of such a delay line, the pulse will be reflected therefrom in inverted form, the reflected pulse arriving at the point 49 substantially six microseconds after the start of the pulse from the amplifier 41. The voltage at point 49 is applied as at 50 to an amplifier 51, so biased that it will respond only to negative pulses. Amplifier 51 includes a differentiating circuit so that its output will be a short, sharply peaked, positive going pulse substantially coincident with the leading edge of the negative pulse applied to its input terminal. This delayed pulse is applied as at 52 to the plate of the diode clamper 46 and also to the output pulse generator 53. The positive, delayed pulse will, in the absence of the gating voltage on the cathode of the diode clamper, cause the latter to conduct and form a low impedance path for the delayed pulse so as to prevent its peak voltage from reaching a value sufficient to trigger the output pulse generator. However if the delayed pulse occurs while the gating voltage exists at the cathode of the diode, the latter will not conduct and the delayed pulse will rise to a peak value sufficient to trigger the output pulse generator.

The operation of this unit, to distinguish between pulses of various time length is as follows. Consider first a gating pulse having a time length of less than three microseconds, for example, a pulse of two microseconds' duration. This pulse will be amplified by the amplifier 41 and will start the saw-tooth generator 43 generating a saw-tooth voltage. However, since the pulse is of less than three microseconds' duration, the peak voltage from the saw-tooth generator will not reach a value sufficient to trigger the gate generator 45. Consequently, no gating voltage will be applied to the cathode of clamper 46. When, 6 microseconds after the start of the pulse, the delayed pulse from the amplifier 51 is applied to the diode plate, the clamper will therefore be conductive and will effectively short out this pulse so that it cannot trigger the output pulse generator 53.

If the pulse has a time length of between three and six microseconds, for example, five microseconds, the gate generator 45 will be triggered and will produce a gating voltage extending from substantially three microseconds to substantially six microseconds after the leading edge of the input pulse. Meanwhile, a delayed pulse will be produced by action of the delay line 48 and amplifier 51, which delayed pulse will appear at the plate of the diode clamper just before the end of the gate. Under these conditions the positive gating pulse will prevent the diode clamper from conducting and the delayed pulse will therefore be applied to, and trigger, the output pulse generator 53 to produce an output pulse at its output terminal 54.

Considering now a pulse having a time length greater than six microseconds, for example eight microseconds, the gate will be produced as above described so as to extend substantially from three to six microseconds after the leading edge of the input pulse. However, under these conditions, there will be interference or cancellation between the positive pulse derived from the cathode of pulse amplifier 41 and the reflected inverted pulse from the delay line 48. Under the assumed conditions, the voltage at point 49 (which is applied at 50 to amplifier 51) will be first a positive going pulse of six microseconds' duration followed by zero voltage for the two microseconds during which interference exists, followed then by a negative going pulse of six microseconds' duration. It should be noted therefore that the negative pulse, which is the only pulse that can trigger the amplifier 51 as above described, will not begin until eight microseconds after the beginning of the input pulse. Thus the resulting delayed pulse applied to the plate of the clamper 46 will occur after the gating voltage has been removed from the cathode thereof and the clamper will again be conductive so as to short out this delayed pulse and prevent its triggering the output generator 53. From the above, it can be readily seen that only those pulses having a desired pulse length, in this case, from three to six microseconds' duration, can cause triggering of the output pulse generator. Therefore, pulses having time lengths outside of the desired range, such as might be produced by interference from radar equipment or from adverse atmospheric conditions, will automatically be prevented from passing through the pulse width discriminator and thus cannot affect the control system.

The output pulse generator 53 is designed so that, when triggered, it will produce a short pulse of predetermined time length and amplitude, which will be entirely independent of the time length or amplitude of the input pulse. Moreover, the leading edges of the output pulses will always be delayed a constant amount relative to the leading edges of the input pulse and thus will provide an accurate indication of the time of arrival of the corresponding guidance pulses.

Since it is highly desirable that the gain of the receiver be automatically varied in accordance with the signal strength of the received guidance pulses but that it not be affected by other, interfering pulses, the output from the pulse width discriminator is used to control a gating circuit which will permit only the desired pulses to control the gain of the receiver. To this end, the output from the generator 53 is applied as at 55 to the grid of a gating amplifier 56 so biased that it will be conductive only while an output pulse is present. Amplifier 56 also has applied to the cathode thereof, as at 57, the delayed pulses from the delay line 48, which, as previously described, will be in the form of inverted or negative going pulses having their amplitudes directly proportional to the amplitudes of the corresponding input pulses. For a pulse having a time length falling within the desired limits (3 to 6 microseconds) the gating pulse will appear at the grid of the amplifier 56 simultaneously with the appearance of the corresponding negative pulse at the cathode thereof. It should be pointed out that the output pulse from generator 53 and therefore the gating pulse applied to the amplifier 56 is of much shorter duration than the guidance pulses and, as a result, the amplitude alone of the guidance pulse is, in effect, sampled by the gating action so that the output of the amplifier will be a pulse of predetermined length (equal to that of the gating pulse, regardless of the length of the guidance pulse) and of an amplitude directly proportional to the amplitude of the corresponding guidance pulse. These gain controlling output pulses from the gated amplifier 56 are applied as at 58 to a chain of amplifiers 59, 60, a pulse stretcher 61, and a D.C. restorer and filter 62, which together serve to produce a D.C. voltage at 63, corresponding in value to the average amplitude of the selected input pulses. This D.C. voltage is applied to the grid of a cathode follower 64, to produce a corresponding voltage at the output thereof which appears at the AGC output terminal 64 and which is connected to the usual IF stages of the receiver so as to automatically vary the gain of the receiver. Since, as was previously described, an output pulse is generated by pulse generator 53 only in response to an input pulse of the desired pulse width, the gated amplifier 56 will permit only such pulses to control the gain of the system.

*Coarse Lane Comparator*

(FIGURE 4)

Two coarse lane comparators or units are provided, one for azimuth and one for range, each being arranged as shown in the block diagram, FIGURE 4. Basically, the coarse lane comparators compare the times of arrival of the master pulse and the slave pulse and provide an output voltage which varies with the time difference between the pulses. The output voltage can be adjusted so that it will equal a predetermined value when the arrival times of the two input pulses corresponds to the desired hyperbolic path passing through the target. Thus considering the azimuth coarse lane comparator 19 shown in FIGURE 4, if the missile is exactly on course, the output voltage will be zero; if it is to one side of the desired path, the output voltage will be positive in sign, while if it is to the other side of the desired course, it will be negative. As shown in FIGURE 4, the master pulse is applied to the input terminal 66 and serves to trigger a trigger tube 67 which will provide a short output pulse substantially coincident in time with the leading edge of the input pulse. This output pulse is applied to one of the input terminals of a conventional Eccles-Jordan multi-vibrator 68. Similarly, the azimth pulse will be applied through the other input terminal 69 and will cause firing of a second trigger tube 69', the output of which will in turn be applied to the other input terminal of the Eccles-Jordan multi-vibrator 68. The output from the multi-vibrator will be an inverted square wave having a time length equal to the time difference between the input pulses. This square wave is applied to a limiting amplifier 70 which inverts the pulse and limits its amplitude to a predetermined value. The limited pulse is then superimposed upon a direct current voltage obtained from a manually adjusted potentiometer 70' by means of a D.C. restorer 71. The combined output from the restorer is fed to a low pass filter 72 to produce an ouput voltage having a substantially constant D.C. potential, the value of which will correspond to the time difference between the pair of input pulses. This D.C. voltage is applied through a cathode follower 73 to the output terminal 74. By suitable adjustment of the potentiometer 70, the value of the output voltage at terminal 73 can be regulated so that when the time difference between the two input pulses corresponds in value to the desired hyperbolic path, the output voltage will be zero. The range coarse lane comparator is similar except that it compares the master and range pulses and is adjusted to give zero output voltage when the desired range hyperbola is reached.

*Fine Lane Comparator*
(FIGURE 5)

The fine lane comparator or unit is shown in block diagram form in FIGURE 5. A single unit is used for both the azimuth and the range pulses. Since, the fine lane comparator is to be effective only when the missile is within a relatively short distance of the desired hyperbolic path, it is arranged to provide a much greater sensitivity than the coarse lane comparator above described. However, like the coarse lane comparator, it may be adjusted so as to produce any desired output voltage when the missile is exactly on a particular hyperbolic guidance path. To obtain the desired greater sensitivity, the individual pulses from the master and slave stations are applied through the input terminals 75 and 76 or 77 as the case may be to individual "ringing" oscillators 78. These "ringing" oscillators are precision oscillators which are adapted to be triggered by the leading edge of an input pulse to produce high frequency oscillations having a frequency of 20 kc. The sine wave outputs from these oscillators are fed through cathode followers 79, clipped by clippers 80 so as to produce a relatively steeply rising wave front, amplified as at 81 and applied to the input terminals of a phase discriminator 82 or 83, which provides an output voltage directly proportional to the phase difference between the sine waves. Interposed between the cathode follower 79 and clipper 80 in the azimuth pulse channel, are a phase shifter 84 and an amplifier 85. The phase shifter may be manually adjusted so as to effectively retard or advance the phase of the sine wave passing along the azimuth channel so that it will be brought into exact phase coincidence with the signal coming through the master channel when the missile is exactly on the desired hyperbolic path. Thus the azimuth fine lane output voltage will be zero when the missile is exactly on coarse and will rise rapidly in either a positive or negative direction as the missile deviates to the left or right of the desired coarse.

A similar phase shifter 86 and amplifier 87 are provided in the range channel of the comparator for similar adjustment of the phase relationship between the master and range signals so that the output from the range fine lane terminal 89 will have a predetermined value when the missile or aircraft has reached the desired target. The phase shifter will normally be adjusted so that the output voltage at the terminal 89 will fall only to +50 volts, rather than to zero, when the desired range hyperbola is reached.

*Lost Signal Switch*
(FIGURE 6)

Lost signal switch 32 shown in FIGURE 6 is controlled by the outputs from the pulse receivers 13, 14 and 15 and its purpose is to indicate to the rest of the guidance and control system whether or not the various guidance pulses are being received. It consists of three channels each of which consists of a rectifier 202, connected to the input terminal from the pulse width discriminator for that particular guidance pulse, and which rectifies the video pulse therefrom and applys it across a condenser 203. The normal discharge rate of the condenser 203 is made extremely low so that the condenser will be maintained at a steady D.C. potential as long as the particular guidance pulses are being received. The voltage across the condenser 203 is applied to the grid of an amplifier 204 so as to cause the latter to conduct to energize a relay, such as relay 205 in the azimuth channel. Thus, whenever the azimuth guidance pulses are being received, the relay 205 will remain energized to close its contacts 206. The relays 207 and 208 of the other two channels will likewise be energized whenever the pulses are being received for these channels. The master pulse relay 207 is arranged to complete a circuit between a distributing bus 208' and a source 209 of 28 volts D.C. The azimuth and range relays 205 and 208, when energized, connect bus 208' with the azimuth lost signal terminal 210 and the range lost signal terminal 210 and the range lost signal terminal 211, respectively. With this arrangement, it can readily be seen that so long as all three sets of guidance pulses are being received, 28 volts D.C. will appear at the azimuth and range lost signal terminals 210 and 211. If the master pulses are interrupted, relay 207 will be de-energized and will remove the potential from both terminals 210 and 211. On the other hand, if only one of the slave station pulses is interrupted, only its associated terminal 210 or 211, as the case may be, will have the potential removed therefrom, the other of the output terminals still being connected to the 28 volts source through the master relay contacts.

Figure 7:
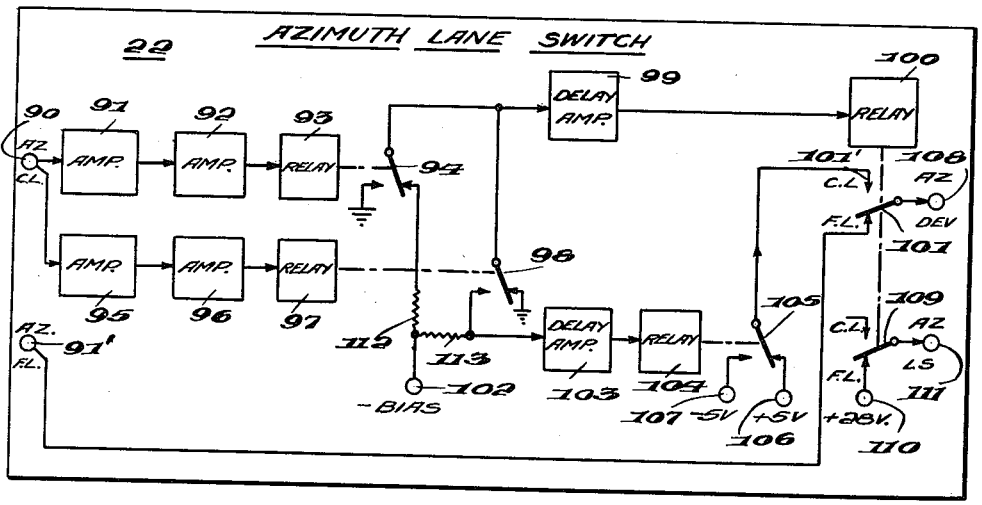

*Azimuth Lane Switch*
(FIGURE 7)

The azimuth lane switch 22 serves to apply the proper signal to the modulator and thence to the rudder control mechanism of the missile depending upon which side of the desired course the missile is flying at any particular time and also depending upon how far away from the desired course the missile is at that time. The azimuth lane switch is shown in block diagram form in FIGURE 7. The output from the azimuth course lane comparator is applied to the input terminal 90. As was previously described, this input will be in the form of a D.C. voltage, the polarity of which will correspond to the direction of deviation, and the magnitude of which will correspond directly to the magnitude of the deviation.

The coarse lane comparator 19 is adjusted so that when the missile is to the left of the desired course, the voltage at the azimuth coarse lane terminal is positive in polarity while if the missile is to the right of the desired course, it will be negative. The fine lane is defined as that region wherein the output from the coarse lane comparator lies between the values of plus one volt and minus one volt. Thus whenever the missile is within the coarse lane to the left of the desired course, the output from the coarse lane comparator will be a positive voltage greater than one volt. If it is in the coarse lane region to the right of the desired course, it will have a negative value greater than minus one volt. This voltage is applied to the grids of amplifiers 91 and 95. Amplifier 91 controls a following amplifier 92 which in turn controls a relay 93 having a movable contact arm 94. The arrangement is such that when amplifier 91 is made conductive it will block amplifier 92 so that the relay 93 will be deenergized as indicated in FIGURE 7. Similarly, amplifier 95 controls amplifier 96, which in turn controls a relay 97 having a movable contact arm 98. Here again, when amplifier 95 is conductive, amplifier 96 will be non-conducting and relay 97 will be deenergized. Conversely, if either amplifier 91 or 95 is not conductive, its associated relay will be energized.

Controlled by relays 93 and 97 is a first delay amplifier 99 which includes in its plate circuit a relay 100 having a movable contact arm 101. As will be later shown, relay 100 is energized only when the missile is in the coarse lane region lying to either side of the fine lane region immediately adjacent the desired course. Whenever the missile enters the fine lane region, relay 100 becomes deenergized, so that its contact arm 101 engages the fine lane terminal to connect the azimuth deviation signal output terminal 108 directly to the azimuth fine lane input terminal 91'. When the relay 100 is energized, indicating that the missile is in one or the other coarse lane region, the contact arm 101 swings into contact with the coarse lane terminal which is connected, as will be described below, to a fixed direct current voltage source. Thus, under these conditions a constant voltage will appear at the azimuth deviation signal terminal 108.

Also controlled by the relays 93 and 97 is a second delay amplifier 103 which in turn controls a relay 104 having a movable contact arm 105. Relay 104 serves to select the polarity of the constant control voltage that will be applied to the azimuth deviation signal output terminal 108 depending upon which of the coarse lane regions the missile is in at that particular time.

Amplifier 91 is so biased that it will conduct only when the azimuth coarse lane voltage is greater than minus one volt in the positive direction. Thus this amplifier will be conductive whenever the missile is in the coarse lane region to the left of the desired path or in the fine lane region, but it will not conduct when the missile is in the coarse lane region to the right of the desired course. Amplifier 95 is so biased that it will conduct only when the azimuth coarse lane voltage is greater than plus one volt. Thus this amplifier 95 will be conductive when the missile is in the coarse lane region to the left of the desired course, but will be non-conducting at all other times.

The operation is as follows. When the missile is in the coarse lane region to the left of the desired path, both amplifiers 91 and 95 will be conductive, blocking the following amplifiers 92 and 96 and deenergizing relays 93 and 97. Under these conditions delay amplifier 99 will have its grid grounded by contact arm 98, causing the amplifier to conduct and energize relay 100 to switch its contact arm 101 to the coarse lane terminal 101'. At the same time, delay amplifier 103 will be connected to a source of negative bias 102 through the resistor 113 and will therefore be made non-conductive. Relay 104, controlled thereby, will accordingly be in its deenergized condition with its contact arm 105 making connection to the +5 volt terminal 106. This D.C. voltage will therefore appear at the yaw signal output terminal 108 and, as will later be described, will cause a predetermined constant correction to be applied to the missile controls so as to cause the missile to fly along a path angling toward the desired course at substantially 15°.

When the missile enters the fine lane region the azimuth coarse lane voltage applied to terminal 90 will be reduced to less than one volt positive, as previously described. Under these conditions, this input voltage will not be sufficient to overcome the bias on amplifier 95 which will therefore become non-conducting and thereby unblock the following amplifier 96. This latter will then become conductive and will energize relay 97 to switch its contact arm 98 so as to unground the grid of delay amplifier 99 and to connect it to the bias source 102. This will result in blocking the amplifier 99 so that it will deenergize the relay 100, shifting the contact arm 101 thereof to the fine lane position. As previously described, under these conditions, the azimuth fine lane voltage from the fine lane comparator 21 will appear at the output terminal 108 of the lane switch, the polarity and amplitude thereof corresponding to the relative position of the missile with respect to the desired course.

If the missile overshoots the fine lane region or is initially to the right of the fine lane region, the voltage appearing at terminal 90 will have a negative value greater than minus one volt. Under these conditions, this voltage will be insufficient to overcome the bias of either amplifier 91 or 95, with the result that these amplifiers will be non-conducting and their associated relays 93 and 97 will both be energized. As a result, both delay amplifiers 99 and 103 will have their grids grounded, amplifier 99 through contact arm 94 to ground, and amplifier 103 through contact arms 98 and 94 to ground. This will make both of these amplifiers conductive and their plate relays 100 and 104 will therefore both be energized. Relay 100 will again shift its contact arm 101 to the coarse lane terminal and relay 104 will shift its contact arm 105 to the —5 volt terminal 107 so as to apply this potential to the azimuth deviation signal output terminal 108. This steady negative voltage at the yaw signal terminal will cause the missile to assume a position wherein it will approach the desired course at substantially 15°.

Relay 100 is provided with a second contact arm 109 which is adapted, whenever the relay is in its deenergized or fine lane position, to connect an azimuth lane switch output terminal 111 with a 28 volt D.C. source indicated at 110. The output from the azimuth lane switch control terminal 111 is used to control various azimuth lane switch relays, later described, whenever the missile moves into or out of the fine lane region.

Resistors 112 and 113 are for the purpose of preventing a short circuit of the bias source 102 when either or both of the relays 93 or 97 have their contact arms connected to ground.

*Range Lane Switch*

(FIGURE 8)

The range lane switch 30, as shown in FIGURE 8, is quite similar to the azimuth lane switch above described except that, since the missile will ordinarily never get past the range hyperbola passing through the target, only one coarse lane region will be involved and only one amplifier and relay channel is required. The output from the range coarse lane comparator is applied as at 114 to an amplifier 115. This amplifier is so biased that it will be conductive only when the range coarse lane voltage is greater than +1 volt. Therefore, until the voltage decreases below this value, corresponding to entry of the missile into the range fine lane region close to the target, amplifier 115 will be conductive and will block its following amplifier 116 which controls the relay 117. Under these conditions the relay 117 will be deenergized so that its contact arm 118 connects the grid of delay amplifier 119 to a source of blocking bias 120. Relay 121, controlled by the amplifier 119 will therefore be deenergized and its contact arm 122 will be in the coarse lane position shown in FIGURE 8, connecting a 28 volt D.C. source 123 to the range switch output terminal 124. Conversely, when the missile passes into the range fine lane region as it approaches near the target, the voltage at terminal 114 will drop below the +1 volt value necessary to overcome the bias on amplifier 115, causing the latter to become non-conducting, unblocking the amplifier 116 and energizing the relay 117. Relay 117 will thereupon shift its contact arm 118 to its grounded terminal unblocking the amplifier 119 to energize the relay 121, which in turn, will shift its contact arm 122 to the fine lane position and remove the potential from the output terminal 124. As will be later described, the potential at range lane switch terminal 124 is used to control various range lane relays in the other units of the system whenever the missile is in the coarse range lane.

*Modulator and Sensitivity Switch*

(FIGURE 9)

The modulator and sensitivity switch 23 is shown in block diagram form in FIGURE 9. This unit is for the purpose of converting the azimuth deviation output voltage from the azimuth lane switch into a form suitable for control of the rudder actuating mechanism. The azimuth deviation voltage, in the form of a D.C. voltage is applied at terminal 171 and is fed to a 400 cycle chopper 172 which converts the D.C. deviation voltage into a square wave voltage of corresponding amplitude. The square wave voltage is fed through a variable gain amplifier 173 and a cathode follower 174 to a filter 175 which is adapted to pass the 400 cycle sine wave component of the square wave and to offer high impedance to the harmonic components of the square wave. The output from the filter will therefore be a substantially pure 400 cycle sine wave voltage, the amplitude of which is directly proportional to the D.C. deviation voltage applied at the terminal 171. This 400 cycle A.C. voltage is again amplified at 176 and applied to the output terminal 177. It should be noted that the phase of the A.C. voltage at the terminal 177 will depend upon the polarity of the D.C. voltage applied at the input terminal 171 so that the voltage appearing at the output terminal 177 will not only correspond in amplitude to the amplitude of the input voltage but its phase will depend upon the direction of the deviation.

As is apparent from a consideration of FIGURE 1, in the absence of any means for compensating therefor, the volts-per-foot sensitivity of the control system would steadily decrease as the missile moved further and further away from the base line between the master and slave azimuth stations due to divergence between the hyperbolic guidance paths. Means are therefore provided to increase the gain of the amplifier 173 in substantially direct proportion to this divergence or lane expansion factor. To obtain this result, the output from the range coarse lane comparator is applied at terminal 178 and is fed through resistors 179 and 180 to the input of a cathode follower 181. The output voltage from the cathode follower 181, serves as a cathode bias voltage for the amplifier 173, being applied thereto as indicated at 182. When the missile is a considerable distance away from its destination, the range coarse lane voltage will be relatively high and will produce a correspondingly high cathode bias on the amplifier 173, thus lowering the gain of the latter. However, as the missile approaches the target, the range coarse lane voltage decreases to lower the cathode bias on the amplifier 173 and to correspondingly increase the gain thereof. By proper choice of components, it is readily possible to thus maintain the overall sensitivity at a substantially constant volts-per-foot deviation value throughout the entire range.

Provisions are also made for maintaining the gain of amplifier 173 at a constant, medium value in the event that the range guidance signals are lost. For this purpose, a range lost signal relay 183 is provided, which, when it is deenergized due to loss of the range signals, moves its contact arm 184 into electrical connection with a low voltage D.C. source as indicated at 185. This voltage is therefore applied to the junction between resistors 179 and 180 and through the latter to the cathode follower 181, causing a steady, medium value of cathode bias to be applied to the amplifier 173.

It is also desirable that the sensitivity of the controls of a missile of the type under consideration be considerably increased when the missile is flying within relatively close limits along the desired course. To provide for such increased control sensitivity, a sensitivity switch unit is incorporated in the system. This unit is controlled by the output of the cathode follower 174 as indicated at 186, the square wave output of the cathode follower being amplified as at 187 and then rectified and filtered as at 188. The resulting D.C. voltage is applied to the first of a pair of direct-coupled amplifier stages 189 and 190. Amplifier 190 includes in its plate circuit a relay 191 having a contact arm 192 directly connected to the sensitivity control terminal 193.

When the relay 191 is energized, it will swing its contact arm 192 into contact with the terminal 196 which is connected to the azimuth lane switch input terminal 197. As previously described, the azimuth lane switch terminal will have a 28 volt D.C. potential applied thereto, whenever the missile is within the azimuth fine lane region. Thus, when the relay 191 is energized and the missile is within the fine lane region, the 28 volt D.C. potential appearing at terminal 197 will be applied to the sensitivity output terminal 193.

As indicated in FIGURE 2, the voltage appearing at sensitivity output terminal 193 is used to energize a sensitivity control relay 230 interposed between the modulator and the mixer 24. The output from the modulator is applied across a voltage divider 231 and normally, when sensitivity control relay 230 is deenergized, its contact arm 232 applies but a portion of the modulator output voltage to the mixer 24 and thence to the rudder control servo-amplifier 25. However, when sensitivity control relay 230 is energized, it switches its contact arm to the top of the voltage divider so that the entire output voltage from the modulator will be applied to the servo-amplifier, with a resulting increase in control response sensitivity.

Relay 191 is controlled by the amplitude of the azimuth deviation voltage so that it will be deenergized until such time as the missile is within the fine lane region and is within a predetermined distance of the desired hyperbolic path. Obviously, the D.C. output from the filter 188 will correspond in value to the amplitude of the square wave voltage from the cathode follower 174 and will be entirely independent of the phase thereof. If this amplitude is relatively large, corresponding to a rather large deviation from the desired course, the amplifier 189 will draw rather large current resulting in a considerable drop in its plate voltage. Since amplifiers 189 and 190 are directly coupled, the grid voltage of the latter will correspondingly be at a low value, causing but small plate current to flow therein, of insufficient value to energize the relay 191. However, as the square wave voltage decreases, indicating that the missile is approaching close to the desired course, amplifier 189 will draw less current, causing a corresponding rise in its plate voltage and in the grid voltage of amplifier 190. The latter will therefore draw sufficient current to energize the relay 191.

Note that since the sensitivity unit derives its voltage from a point beyond the variable gain amplifier 173, the voltage will be substantially independent of the lane expansion factor and will cause actuation of relay 191 at a substantially constant distance from the desired path regardless of the range location of the missile at that particular time.

To prevent false information from the modulator in the event that azimuth guidance signals are lost, an azimuth lost signal relay 198, connected to the azimuth lost signal bus as at 199, is provided to open the circuit at 200 between amplifier 176 and output terminal 177 under lost signal conditions.

Ground Speed Unit (FIGURE 10)

The ground speed unit shown in FIGURE 10 in block diagram form is for the purpose of providing at its output terminal 125 a D.C. voltage corresponding to the ground speed of the missile at a particular time. As earlier described, this ground speed voltage is used in predicting the time of arrival of the missile at its intended destination in the event that guidance signals are lost before the missile reaches such destination. Obviously, too, this ground speed voltage is also readily available for other purposes, such as determining the proper bomb release or dive point, in the case of a military guided missile, to insure that the bomb or missile will follow the proper trajectory to hit the intended target.

The output voltage at the terminal 125 is derived from a motor-actuated potentiometer 126. When the missile is in the range coarse lane region, the setting of this potentiometer is controlled by the setting of a manually adjustable potentiometer 127. On the other hand, when the missile is within the range fine lane region, it is controlled in accordance with the rate of change of the range fine lane voltage derived from the fine lane comparator. Since the range fine lane voltage is, at any time when the missile is flying on course toward the target and is relatively close thereto, proportional to the distance remaining to the target, the rate of change of this voltage corresponds to the rate of change of the distance, or, in other words, to the true velocity or ground speed of the missile. Thus, by applying the range fine lane voltage to a differentiator 128, a voltage will be obtained from the output of the differentiator which, when the missile is in the range fine lane region, will be directly proportional to the true ground speed of the missile. This voltage is applied to the fine lane contacts 129 of a range lane switch relay 130. The voltage from the potentiometer 127 is similarly applied to the coarse lane contacts 131 of the lane switch relay. Thus, one or the other of these voltages will be applied through the contact arm 132 of the relay 130 to a servo amplifier 134, the output of which controls the operation of a servo-motor 135 which adjusts the setting of the potentiometer 126 as indicated at 136. The output voltage from the potentiometer 126 is applied through a feed-back loop 137 to the servo-amplifier 134 in such a fashion as to buck the input voltage from the contact arm 132 of the relay 130. Thus the potentiometer will be adjusted by the servo-mechanism to a position wherein its output voltage is directly proportional to the true ground speed of the missile.

Interposed between the servo-amplifier and the servo-mechanism is a switch 138 actuated by a range lost signal relay 139, which relay becomes deenergized whenever the range guidance signals are lost. Thus, in the event that the signals are lost, the potentiometer 129 will remain in its last position of adjustment to provide an output voltage corresponding to the last known speed of the missile prior to loss of the guidance signals.

Arrival Predictor

(FIGURE 11)

The arrival predictor 38 is controlled by the range lane switch 30 and the range output of the lost signal switch 32 so as to provide at its output terminal 140 a D.C. voltage corresponding at all times to the distance remaining to the target. It includes a lost signal relay 141 connected to the lost signal input terminal 142 so as to be energized whenever the master and range guidance pulses are being received. Under these conditions the voltage at the output terminal 140 will be controlled by the range fine lane or coarse lane voltages applied to the input terminals 143 and 144 respectively.

In order to make the range coarse lane input correspond to the range fine lane input so far as its effect on the predicting circuits is concerned, it is first applied to an alternate coarse lane unit 144' wherein the coarse lane voltage is superimposed upon a 50 volt pedestal voltage so that the output from the alternate coarse lane unit will, like the fine lane voltage, drop only to a +50 volt value when the missile reaches its intended target.

A range switch relay 145, having a movable contact arm 146 and controlled by the output voltage from the range lane switch appearing at the terminal 147, is provided to select which of the range lane voltages will control the output voltage from the predictor at a particular time. Whichever of these voltages is selected by the relay 145 is applied through the terminal 148 and contact arm 149 of the lost signal relay 141 to the grid of a cathode follower 150. The output voltage, derived from the cathode of the cathode follower is applied directly to a condenser 151 of relatively large capacity, which is thereby charged through resistor 152 and part of a voltage divider 153 to a corresponding voltage value. Since, as the missile moves toward the target, the range lane voltage from the comparator will steadily decrease in value, the voltage appearing at the output of the cathode follower 150 will similarly decrease in value. Condenser 151 will accordingly discharge at a corresponding rate through the resistor 152 and a part of potentiometer 153 to ground. Thus, while guidance signals are present, the condenser 151 will at all times have a charge corresponding to the input from the range comparator and corresponding therefore to the remaining distance to the target.

If the range guidance signals are lost, the lost signal relay 141 will be deenergized to move its contact arm 149 away from terminal 148 and into contact with the terminal 154 which is connected to the output of a compensated D.C. amplifier 155. The grid of this amplifier is connected to the junction 156 between the condenser 151 and resistor 152 so that its voltage output will vary inversely with the voltage appearing at said junction point. A ground speed input terminal 157 is connected to the output of the ground speed unit 39 and is connected to the ungrounded end of the voltage divider 153. Thus the voltage appearing at any particular point on the voltage divider 153 will at all times be directly proportional to the ground speed of the missile. Depending upon whether the missile is, at a particular time, in the fine lane or coarse lane region, a predetermined proportion of the ground speed voltage will be picked off from the voltage divider through the movable contact arm 158 of a selector relay 159 and applied through the resistor 152 to said junction point 156. Thus the ground speed voltage in effect, controls the bias of the D.C. amplifier 155 and the voltage charge on the condenser 151 is superimposed thereon.

Assuming that the signals have been lost, condenser 151 will start to discharge as previously described. This will lower the voltage applied to the grid of the D.C. amplifier 155. This will cause the voltage at the output of the D.C. amplifier to increase to give a corresponding increase in the voltage appearing at the output terminal of the cathode follower 150 and tending to recharge the condenser 151. If the condenser tends to lose its charge too rapidly, the voltage at the output of the cathode follower will be raised correspondingly to increase the charging rate of the condenser. If it tends to discharge too slowly, the voltage at the output of the cathode follower will drop to lower the charging rate. At one particular discharge rate the loop circuit will be balanced so that the output voltage from the cathode follower will decrease in substantially straight line fashion, with the net rate of decay being directly proportional to the ground speed voltage applied to the terminal 157. By proper selection of the resistors 152 and of the tap positions on voltage divider 153, the circuit can readily be adjusted so that the time required for the voltage at the output terminal 140 to fall to a predetermined value will correspond exactly to the time that would be required for the missile to fly to the target from its position when the guidance signals were lost.

Obviously, since, as has been previously described, the coarse lane and fine lane comparator voltages decrease at different rates for a particular amount of movement of the missile, it is necessary to provide two rates of discharge for the condenser 151. This is obtained by means of the selector relay 159, previously mentioned. When this selector relay is energized, corresponding to coarse lane conditions, the contact arm 158 connects the resistor 152 to a tap 160 on the voltage divider fairly close to the grounded end thereof so that but a small portion of the ground speed voltage will be applied to the grid of the amplifier 155. This will result in a very slow net rate of discharge of the condenser 151 and a correspondingly slow drop in voltage at the output terminal 140. On the other hand, when the relay 159 is deenergized, as will occur after the missile has entered the range fine lane region, the contact arm 158 will swing to a position wherein it makes contact with a terminal connected to a tap 161 fairly high up on the voltage divider 153. This will apply a much greater proportion of the ground speed voltage to the grid of the amplifier 155 and will permit a correspondingly greater net rate of discharge of the condenser 151 and decay of the output voltage at the terminal 140.

Relay 159 is controlled as follows, to select the proper tap on the voltage divider 153. A lost signal relay 162 is arranged so that it will be energized whenever the range guidance signals are present so as to swing its contact arm 163 into contact with the terminal 164 which is connected to the range lane switch input terminal 147. As previously described, terminal 147 has applied thereto the voltage output from the range lane switch 30 so that whenever the missile is within the coarse lane region, a 28 volt D.C. voltage appears thereat. This voltage is therefore applied through the contact arm 163 to a second relay 165, causing the latter to be energized to swing its contact arm 166 into engagement with a contact 167, having a 28 volt D.C. potential impressed thereon. This in turn serves to energize the coil of the relay 159 previously described, causing it to swing the contact arm 158 into its coarse lane position. If the range guidance signals are lost while the missile is still within the coarse lane region, relay 162 will be deenergized, permitting its contact arm 163 to move into contact with the terminal 168, which is directly connected as at 169 to the junction between the contact arm 166 of relay 165 and the coil of relay 159. Relay 165 has a condenser 170 of relatively large capacity connected in parallel with its coil to delay the deenergization thereof and thus to maintain its contact arm 166 in energized position, that is, in contact with the 28 volt terminal 167, for a short time after its normal energizing circuit has been broken. Under the circumstances described above, contact arm 166 will therefore remain in contact with the 28 volt source 167, thus maintaining relay 159 energized, until after the contact arm 163 of relay 162 has made contact with the terminal 168. As soon as this latter event has occurred, a new energizing circuit will be established for the coil of relay, extending from the 28 volt source 167, through the contact arm 166, connection 169, terminal 168 and contact arm 163 to the relay coil. Thus selector relay 159 will be maintained energized and will maintain its contact arm 158 in contact with the coarse lane tap 160. If the guidance signals are again received, the range lost signal relay 162 will again be energized to swing its contact arm 163 into engagement with the terminal 164 and restore relay 165 to control by the voltage appearing at the range switch input terminal 147. From the above, it can be seen that so long as the missile is flying within the range coarse lane region, once the range signals have been received, the contact arm 158 of the selector relay 159 will always be maintained in its coarse lane position, even though the guidance signals are later lost.

Assume now that the missile moves into the fine lane region, with the guidance signals present. The control voltage at the terminal 147 disappears due to operation of the range lane switch 30, causing deenergization of the relay 165. After the short timing period has elapsed, its contact arm 166 will swing away from the terminal 167 to deenergize the relay 159 and cause the contact arm 168 of the latter to swing upwardly to its fine lane position. Note that under these conditions, since the lost signal relay is still energized, the connection 169 is ineffective to maintain the relay 165 energized. If now, while the missile is in the fine lane region, the guidance signals are lost, lost signal relay 162 will be deenergized, but this will have no effect on the system and the relay 159 will remain in its deenergized, fine lane position. Thus it can be seen that the arrival predictor 38 will provide at all times a voltage at its output terminal which will be directly proportional to the distance remaining to the target and which will decay in straight line fashion at a rate corresponding to the ground speed of the missile.

*Destination Signal Generator*

(FIGURE 12)

The destination signal generator 35 is shown in block diagram form in FIGURE 12. As indicated in FIGURE 2, the voltage appearing at its input terminal 212 is derived from one of three sources depending upon the particular conditions at the time. If range guidance signals are present and the missile is in the range coarse lane region a steady 300 volt potential will be applied. If range guidance signals are present and the missile is in the range fine lane region, the voltage from the range fine lane comparator will appear at the input terminal. If range guidance signals are not present, the input voltage will be derived directly from the arrival predictor. In either of the last two cases, the input voltage will decay at a steady rate and will fall to a value of +50 volts at the time that the missile reaches its target.

This input voltage is fed to an amplifier 213, the plate voltage of which will vary inversely with the amplitude of the input voltage. When the latter has fallen to the predetermined value, in this case 50 volts, indicating arrival of the missile at the target, the output voltage from amplifier 213 will reach a value sufficient to cause the gas trigger tube 214 to fire and to energize its plate relay 215. Relay 215 thereupon closes its contacts 216 to apply a 28 volt potential obtained from the terminal 217 to its output terminal 218. The voltage appearing at the output terminal 218 can be used in any desired manner, depending upon the function of the missile or guided aircraft. For example, if the missile is intended to dive into the target, actuation of the relay 215 can be used to apply a dive signal to the control system of the missile. Or, if the guidance system is applied to an ordinary aircraft, operation of the relay 215 may serve to operate a suitable signal in the pilot's compartment to indicate to him that the aircraft has arrived over its destination.

Particularly in the case of a military missile, it is desirable that the guidance pulses be continuously received for some predetermined length of time before the operation of relay 215 is permitted. This is to insure that the guidance pulses are of such strength and consistency as to provide reliable control of the missile. To obtain this result, the control voltage from the range lost signal switch terminal 211 is applied at 219. This voltage is connected through a high resistance 220 to a condenser 221 of large capacity. The junction point 222 between the resistor 220 and condenser 221 is connected to the grid of an amplifier 223 having arming relay 224 in its plate circuit. Arming relay 224, when deenergized, grounds the output of the amplifier 213 through its points 225 and the resistor 226 so that the output voltage therefrom cannot reach value sufficient to trigger the gas tube 214. When the range signals are being received, 28 volts is applied through the resistor 220 to the condenser 221 causing the latter to charge slowly until, after the expiration of about 25 seconds, the voltage at the point 222 is of sufficient value to cause the amplifier 223 to pick up the arming relay 224, thus removing the ground from the output of the amplifier 213. Relay 24 is made self-holding in conventional fashion, so that when it has once been energized, it will remain so. Thus once the range guidance pulses have been received for a 25 second interval, the destination signal generator is armed and thereafter will energize its relay 215 when the guidance system, or the arrival predictor indicates that the missile has arrived at its destination.

*Operation*

The operation of the guidance system is believed to be clear from a consideration of the individual elements set forth above. However, to summarize, assume that the missile is to be launched from a launching point 227 located at some convenient point generally between the master station 1 and the azimuth slave station 2.

Assume further that the intended destination 6 is located at the intersection of the azimuth guidance hyperbola 1950 and the range hyperbola 2100. Before launching, the comparators 19, 20, and 21 will be adjusted so that their outputs will correspond to the desired values when these hyperbolas are reached as previously described, and the potentiometer 126 within the ground speed unit 29 will likewise be set to provide an output voltage corresponding to the expected speed of flight of the missile. The missile will then be launched by an appropriate means and, since it is initially quite far removed from the azimuth guidance hyperbola 1950, it will be caused to fly, under the control of the azimuth coarse lane comparator at a substantially 15° angle toward the path 1950. As the missile reaches a position relative to the azimuth hyperbola 1950 wherein the coarse lane voltage drops to the value indicative of the boundary of the fine lane region, the azimuth lane switch will be actuated so that the modulator and rudder control system will be under the direct control of the azimuth fine lane comparator 21.

As previously described, any tendency to drift to one side of the desired path due to the action of a side wind, will be automatically compensated for by the action of the integrator 28 and direction gyro 29. As a result, the path 228 of the missile will merge with and thereafter follow extremely closely the hyperbola 1950 to the target. Any departure of the missile from the path 1950 will instantly be corrected for, due to the fact that the azimuth and master pulses will have a time spacing different than the 1950 microsecond value corresponding to the "on-course" condition and will instantly cause a corresponding correction voltage to be applied to the servo system.

Also, as has previously been described, the response sensitivity of the rudder servo-amplifier will be automatically varied, both to compensate for the lane expansion effect as previously described and also to provide extreme sensitivity, by operation of the sensitivity switch portion of the modulator unit 23, when the missile is flying within the fine lane region and extremely close to the desired course.

If the azimuth guidance pulses are lost, the azimuth lost signal relays will disconnect the azimuth guidance channels from the control system, and the missile will continue to fly its last indicated course under control of the direction gyro.

Meanwhile the master and range pulses are being received and compared in the range fine and course lane comparators. Throughout all but the final few seconds of the flight, the missile will be within the range coarse lane region and the range lane switch 30 will be actuated so as to energize the various range switch relays, including the range switch relay 31 which therefore functions to prevent premature generation of the destination signal. Meanwhile the arrival predictor is continually in operation, although its output voltage is not being used as long as the range guidance signals are being received, and at its output will have a voltage corresponding at all times to the distance remaining to the destination. Thus, if the signals are lost, the lost signal switch 32 will de-energize the lost signal relay 34 to place the destination signal generator under the control of the arrival predictor. While, when the missile is in the coarse lane region, the ground speed unit 39 provides a ground speed voltage which is merely an estimated approximation of the true ground speed of the missile, its value will be sufficiently accurate so that in the event the signals are lost, the destination signal will be triggered by the arrival predictor only when the missile is within reasonably close distance of the actual target.

Assume, however, that the range guidance signals continue to be received, as the missile approaches a point along the path 228 relatively close to its target, the range lane switch relay 31 will be deenergized to connect the destination signal generator to direct control by the range fine lane output from the fine lane comparator 21. When this latter voltage drops to a predetermined value, the destination signal generator will be triggered as above described to signal the arrival of the missile over the target.

If, on the other hand, while the missile is within the range fine lane region, the range guidance pulses are lost, the destination signal generator will be placed under the control of the arrival predictor 38. It should be noted that when the missile is within the range fine lane region, the ground speed voltage output from the ground speed unit 39 will be directly proportional to the true ground speed of the missile and, as a result, the destination signal will be triggered with extreme accuracy.

While but one form of the invention has been described in detail, it is obvious that many changes could be made while still retaining the novel principles and concepts involved in the illustrated embodiment. While the system is primarily intended for use in military guided missiles of the type which are intended to be dived onto the target, it is obviously equally applicable for use in other forms of aircraft, either piloted or pilotless, since the destination signal can obviously be used for any desired purpose. Also it is clear that certain of the refinements, which are particularly desirable in conjunction with such guided missiles, could be eliminated with a resulting simplification of the system where less accurate guidance is deemed necessary. For example, except in military use, there would probably be no need for a pulse width discriminator, since radar pulses would ordinarily not be encountered. Similarly, where the accuracy requirements are less stringent, a single comparator could be used for each channel, rather than switching control of the missile between the coarse lane and fine lane comparators as in the disclosed embodiment. Obviously, too, the individual elements shown in block diagram form could be modified in innumerable ways without departing from the basic operation or concept described herein.

We claim as our invention:

1. In a remote guidance system for a craft, means for causing said craft to follow a predetermined course to a desired destination, remote guidance means operatively independent of said craft for transmitting range signals to said craft, and means responsive to said range signals for generating a voltage which varies as the distance from said craft to the destination along said path, means for differentiating said voltage to determine the rate of change thereof to produce a second voltage proportional to the speed of said craft along said path, a condenser subject to said first voltage, and means responsive to loss of said range signals for causing said condenser to discharge at a rate controlled by and proportional to the value of said second voltage existing at the time said range signals were lost whereby the voltage across said condenser will reach a predetermined value substantially as the craft reaches said target, and means responsive to said predetermined voltage for producing a signal indicating such arrival.

2. In a system for guiding an aircraft to a predetermined destination, a plurality of spaced signal transmitting stations adapted to transmit guidance signals having predetermined time-phase relationships to one another, means carried by said aircraft and responsive to the guidance signals from one pair of said stations for determining the time-phase of said pair of signals as received at said aircraft and direction control means controlled by said time-phase-determining means for causing said aircraft to fly along a hyperbolic course passing through said destination and having said first pair of stations as its foci and corresponding to a predetermined constant time-phase relationship of said received signals, means carried by the aircraft and responsive to the signals from a second pair of said stations for determining the time-phase of said second pair of signals as received at the aircraft, and means responsive to said last-mentioned time-phase-determining means for generating a destination-arrival signal when the time-phase of said second pair of received signals reaches a value corresponding to that of a second constant time-phase hyberbola passing through said destination and having said second pair of stations as its foci, lost signal means controlled by said first pair of received signals and operable upon loss of reception of either of said first pair of signals to disconnect said direction control means for control by said first time-phase determining means, said direction control means including mechanism effective under such lost-signal conditions for causing said aircraft to continue to fly along the course indicated by the guidance signals just prior to the loss thereof.

3. In a system for guiding an aircraft to a predetermined destination, a plurality of spaced signal transmitting stations adapted to transmit guidance signals having predetermined time-phase relationships to one another, means carried by said aircraft and responsive to the guidance signals from one pair of said stations for determining the time-phase of said pair of signals as received at said aircraft and direction control means controlled by said time-phase-determining means for causing said aircraft to fly along a hyperbolic course passing through said destination and having said first pair of stations as its foci and corresponding to a predetermined constant time-phase relationship of said received signals, means carried by the aircraft and responsive to the signals from a second pair of said stations for determining the time-phase of said second pair of signals as received at the aircraft, and means responsive to said last-mentioned time-phase-determining means for generating a destination-arrival signal when the time-phase of said second pair of received signals reaches a value corresponding to that of a second constants time-phase hyperbola passing through said destination and having said second pair of stations as its foci, lost signal means controlled by said first pair of received signals and operable upon loss of reception of either of said first pair of signals to disconnect said direction control means from control by said first time-phase-determining means, said direction control means including mechanism effective under such lost-signal conditions for causing said aircraft to continue to fly along the course indicated by the guidance signals just prior to the loss thereof, an arrival predictor controlled by said second time-phase determining means and responsive to the magnitude and rate-of-change of the output thereof for predicting the estimated time of arrival of said aircraft over said destination, and means responsive to loss of either of the signals of said second pair for switching the destination-arrival signal generator from control by the time-phase determining means to control by the arrival predictor.

4. In a guidance system for an aircraft, spaced means operatively independent of said aircraft for transmitting guidance signals having a predetermined time-phase relationship, means carried by the aircraft and responsive to a pair of said signals for producing a control correction signal whenever the time-phase relationship of said pair of guidance signals as received at the aircraft differs from a predetermined value, and direction control means controlled by said control correction signal for causing said aircraft to turn in such direction as to fly toward a position wherein the time-phase relationship of said received signals return to the predetermined value and said control correction signal disappears, whereby said aircraft will be caused to fly along a predetermined hyperbolic path having said transmitting means as its foci, range determining means responsive to the time-phase relationship of a second pair of said signals for continuously measuring the distance of said aircraft from its desired destination, and means controlled by said range determining means for varying the response of said direction control means to said control correction signal in accordance with said distance whereby to maintain the control response sensitivity substantially constant.

5. In a system for guiding an aircraft along a predetermined path, means for transmitting guidance signals to said aircraft, a coarse lane unit carried by said aircraft and responsive to said guidance signals for producing an output signal the magnitude of which increases at a predetermined rate in relation to the deviation of said aircraft from said path, a fine lane unit also responsive to said guidance signals for producing a second output signal the magnitude of which increases at a relatively higher predetermined rate relative to such deviation, direction control means for controlling the direction of flight of said aircraft, means responsive to the output signal from said coarse lane unit for applying a steady correction signal to said direction control means to cause said aircraft to fly at a substantially constant angle toward said course whenever the magnitude of said coarse lane output signal is greater than a predetermined value and operative upon decrease of the magnitude thereof below said predetermined value to switch control of the direction control means directly to the output of said fine lane unit whereby the direction control means will be actuated in accordance with the output signals from said fine lane unit.

6. In a system for guiding a craft to a predetermined destination, a plurality of spaced signal transmitting stations, operatively independent of said craft and adapted to transmit guidance signals having a definite time-phase relationship to one another, means carried by said craft and responsive to a pair of said guidance signals for producing an error signal corresponding to the difference between the relative time-phase of said pair of guidance signals as received at said craft and a predetermined time-phase relationship defining a hyperbolic path to said destination, range determining means responsive to the time-phase relationship of a second pair of said signals and providing an output on said craft corresponding to the distance from said craft to said destination, means responsive to the error signal for producing a control correction signal indicative of the direction and extent of the lateral deviation of said craft from said hyperbolic path, said last mentioned means being controlled by the output from said range determining means so that, for any given error signal, the correction signal will increase as the range decreases, whereby the control correction signal produced by any particular deviation of the craft from the path will remain substantially constant throughout the movement of the craft toward said destination.

References Cited in the file of this patent
UNITED STATES PATENTS

| 2,428,011 | Chatterjea et al. | Sept. 30, 1947 |
| 2,439,044 | Ferrill | Apr. 6, 1948 |
| 2,454,415 | Tourshou | Nov. 28, 1948 |
| 2,472,129 | Streeter | June 7, 1949 |
| 2,508,565 | Chance | May 23, 1950 |

(Other references on following page)

UNITED STATES PATENTS

| | | |
|---|---|---|
| 2,516,356 | Tull | July 25, 1950 |
| 2,553,983 | Saxman | May 22, 1951 |
| 2,556,074 | Eberhard | June 5, 1951 |
| 2,570,236 | Hoeppner | Oct. 9, 1951 |
| 2,576,135 | Moseley | Nov. 27, 1951 |
| 2,581,438 | Palmer | Jan. 8, 1952 |
| 2,597,349 | Longmire | May 20, 1952 |

FOREIGN PATENTS

| | | |
|---|---|---|
| 626,966 | Great Britain | July 25, 1949 |